United States Patent
Dittmer et al.

(12)

(10) Patent No.: US 6,241,826 B1
(45) Date of Patent: *Jun. 5, 2001

(54) PROCESS FOR REGENERATING CATALYTIC CONVERTERS

(75) Inventors: Eckhard Dittmer, Winsen/Luhe; Alexander Schluttig, Hamburg, both of (DE)

(73) Assignees: SAS Sonderabfallservice GmbH, Wildeshausen; HEW Hamburgische Electricitats-Werke AB, Hamburg, both of (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/187,014

(22) Filed: Nov. 5, 1998

(30) Foreign Application Priority Data

Jul. 6, 1998 (DE) .............................................. 198 29 916

(51) Int. Cl.$^7$ ....................................................... B08B 3/12
(52) U.S. Cl. ................................. 134/1; 134/22.1; 134/33
(58) Field of Search ........................... 134/1, 22.1, 22.18, 134/22.19, 23, 26, 32, 39, 33

(56) References Cited

U.S. PATENT DOCUMENTS

| | | | |
|---|---|---|---|
| 4,946,602 | * 8/1990 | Ekberg et al. | 134/1 |
| 4,992,614 | * 2/1991 | Rodewald | 134/1 |
| 5,127,960 | * 7/1992 | Dittrich et al. | 134/21 |
| 5,143,103 | * 9/1992 | Basso et al. | 134/1 |
| 5,378,287 | * 1/1995 | Pedziwiatr | 134/1 |
| 5,707,453 | * 1/1998 | Shurman et al. | 134/1 |
| 5,882,422 | * 3/1999 | Obayashi et al. | 134/1 |

\* cited by examiner

*Primary Examiner*—Randy Gulakowski
*Assistant Examiner*—Saeed Chaudhry
(74) *Attorney, Agent, or Firm*—Pillsbury Winthrop LLP

(57) ABSTRACT

A process for regenerating catalytic converters includes placing the catalytic converter in motion in a cleaning solution and subjecting it to ultrasonic treatment. Catalytic converters so treatable include those which have ceramic bodies and which catalyze the reduction of nitrogen oxides into molecular nitrogen and which substantially include titanium oxide $TiO_2$, tungsten oxide $WO_3$, and active component vanadium pentoxide $V_2O_5$.

15 Claims, No Drawings

PROCESS FOR REGENERATING CATALYTIC CONVERTERS

The invention relates to a process for regenerating catalytic converters that are employed in converting nitrogen oxides into molecular nitrogen.

Catalytic converters, which the reaction in accordance with the following addition formulas $$4NO + 4NH_3 + O_2 \rightarrow 4N_2 + 6H_2O$$

$$2NO_2 + 4NH_3 + O_2 \rightarrow 3N_2 + 6H_2O$$

are used in combustion power plants for reducing $NO_x$ to $N_2$ in the vented air. This type of catalytic converter substantially comprises titanium oxide $TiO_2$, tungsten oxide $WO_3$, and as the active component vanadium pentoxide $V_2O_5$, and is embodied as a ceramic body, preferably with a plate-type or honeycomb structure. For the catalytic activities, the porous structure of the catalytic converter material and thus its internal surface area are decisive. The conversion of nitrogen oxides into molecular nitrogen takes place in vented air from power plants at temperatures of approximately 300 to 400° C. In power plant operation, fly ash, the formation of ammonium sulfate, and the heavy metals or their oxides contained in the vented air typically cause contamination and thus deactivation of the catalytic converter. The particulate contaminants, such as fly ash or nonvolatile salts or oxides, cause a reduction in the active surface area of the catalytic converter, while at the same time poisoning of the catalyst occurs from heavy metals or heavy metal oxides, which are volatile at the operating temperature, and from alkali, alkaline earth and phosphorus compounds. One typical catalyst poison, for instance, is arsenic oxide $As_2O_3$, which is gaseous at the operating temperatures. Severe deactivation can also occur with fuel that contains sulfur, however, because for reaction-dictated reasons the catalytic converter is lined with ammonium sulfate.

Particulate contaminants and deactivation cause losses in activity, with the attendant necessity of replacement with new catalytic converters. In other fields, it is well known that catalytic converters can be subjected to regeneration, for instance by calcination, but the options for regeneration depend very strongly on the type of catalytic converter and on the contaminants or deactivating compounds. In the catalytic converters in question here, which catalyze the conversion of nitrogen oxides into molecular nitrogen, effective regeneration has not until now been possible, because it was believed that this type of catalytic converter was moisture- or water-sensitive, and it was thus also always assumed that adding moisture or water, which is necessarily done during regeneration, would cause an alteration in the activity of the oxides.

Completely surprisingly, it has now been demonstrated that even ceramic catalytic converters of the titanium, tungsten and vanadium oxide type can be regenerated with excellent effectiveness.

According to the invention, a process for regenerating catalytic converters, and the catalytic converters regenerated by this process, is therefore proposed, which is characterized in that the catalytic converter is put in motion in a cleaning solution and subjected to an ultrasonic treatment.

Preferably, this chemical-physical regeneration is preceded and followed by pretreatment and post-treatment steps, in order to further increase the efficiency of the process. In this preferred embodiment, the contaminated catalytic converters are precleaned with dry mechanical means, such as industrial vacuum cleaners, so that all the particulate contaminants that do not adhere firmly are removed in the dry state. If especially stubborn encrustations are present, then a pretreatment with liquid, specifically preferably water at increased pressure, can additionally become necessary. This second stage of the pretreatment is done with the usual pressure cleaners.

In the next pretreatment step, preferably, in a positive displacement reactor, the catalytic converter is freed of all fly ash particles in the internal tubing system of the ceramic. At the same time, liquid is taken up into the porous structures of the catalytic converter, and readily soluble contaminants dissolve out of these structures along with incipient dissolution and hence loosening of poorly soluble compounds inside the ceramic. The solvent, as a rule water, can be increased in its effectiveness by means of motion. Thus the catalytic converters are placed by a crane into the positive displacement basin and then subjected for a relatively long period of time to intermittent up-and-down motions, optionally with the aid of washing systems.

As a rule, the liquid present in the positive displacement basin is water, but depending on the pollution of the catalytic converter it may also contain a certain proportion of low alcohols, as a rule up to approximately 20%. This solution can contain additives that improve the solubility of catalyst poisons or speed up the conversions; as to the rest, one skilled in the art will ascertain the process parameters of temperature, pH value, conductivity and reaction time experimentally and adjust them beforehand in accordance with the type of contaminants and pollutants present in the catalytic converter. Suitable examples of additives are surfactants, flotation promoters, complexing agents, and similar compounds.

Once the catalytic converter in the positive displacement basin has been cleaned of fly ash particles and at least some of the catalyst poisons, the catalytic converter is transferred to the ultrasonic reactor, so that even microparticulate contaminants and any catalyst poisons still present can also be removed. In the ultrasonic reactor, the catalytic converter is exposed to a high-frequency ultrasonic vibration, with a simultaneous flow through it by means of a reciprocating motion in a liquid. The ultrasonic treatment takes place from the opened sides of the catalytic converter, either in alternation or simultaneously. The intensity of exposure to sound can be regulated and adapted to the degree of soiling. During the ultrasonic treatment, the catalytic converter is put in motion in the sonic exposure basin, by a suitable reciprocating device, in such a way that liquid flows occur on the inner surfaces and that there is a migration of the ultrasonic activity zones to the surfaces to be cleaned. The ultrasonic vibration is as a rule in the range from approximately 27 to 40 kHz.

The cleaning liquid, as a rule water, can also have chemicals added to it that improve the separation of poorly soluble contaminants and catalyst poisons, such as lyes, acids, surfactants, or complexing agents, depending on how polluted the catalytic converter is. The treatment is done at temperatures between the freezing and boiling point of the treatment liquid, preferably at approximately 40 to 80° C.

After the conclusion of the ultrasonic treatment, the catalytic converter is removed from the reactor and rinsed. The rinsing sink may be embodied as a spray rinsing sink, immersion rinsing sink, or combination rinsing sink; in it, the residues still remaining after the ultrasonic treatment are removed from the catalyst surfaces by means of a liquid, preferably distilled water or tap water.

The temperature, pH value and possible additives to the rinsing liquid depend on the contaminants found and on the extent to which they are still present.

After the rinsing, the liquid-laden catalytic converter is dried with air; the drying is preferably done with dried, oil- and particle-free air in motion, at temperatures between 20 and 400° C., preferably between 20 and 120° C., and preferably in a drying chamber.

The regeneration of the described catalytic converters by the process of the invention is—even without optimizing the process conditions—up to 95% effective, in terms of the initial activity of the catalytic converter. Optimizing the process conditions makes it possible to achieve virtually 100% regeneration.

The invention will now be described in further detail in terms of several examples:

EXEMPLARY EMBODIMENT 1

Exemplary embodiment 1 pertains to the regeneration of catalytic converters of the type described above by means of distilled water, without additives of any kinds. In power plant operation, adequate quantities of distilled water are produced, in the form of so-called demineralized water. The advantage of using distilled water is its high ionic absorption capacity. Furthermore, the incident temperature of demineralized water is 30 to 35° C., so that additional heating is needed only to a slight extent.

When additive-free distilled water is used, the deposition of additives on the catalyst surface is averted, and additional rinsing operations are unnecessary.

The contaminated catalytic converters, after being dismantled from the catalyst system, are first precleaned with dry mechanical means, using industrial vacuum cleaners, in such a way that all the particulate contaminants that do not firmly adhere are removed in the dry state.

The proportion of clogs in the interior spaces of the catalytic converter is as a rule from 2% to 35%, depending on the degree of soiling.

Depending on the degree of soiling, the quantities of fly ash removed from the surface range between 5 kg and 30 kg per catalytic converter module.

Stubborn encrustations and deposits are removed by washing with distilled water at elevated pressure.

The distilled water (demineralized water) has a pH value of between 7.5 and 8.5 and an electrical conductivity of approximately 1 myS/cm$^2$.

The precleaning water is delivered, along with the waste water from other treatment steps, to a wastewater treatment system.

The catalytic converter modules thus pretreated are delivered by means of a crane to the positive displacement reactor. The positive displacement reactor is filled with distilled water with a pH value of between 7.5 and 8.5 and an electrical conductivity of approximately 1 myS/cm$^2$ in such a way that the catalytic converter modules are completely immersed therein.

In the positive displacement reactor, the catalytic converters are freed of all fly ash particles in the interior spaces of the catalytic converter. At the same time, the distilled water is absorbed into the porous structures of the catalytic converter, and readily soluble contaminants are dissolved out of the porous structures, and poorly soluble compounds begin to be dissolved in the porous structures.

These effects are attained by an accelerated introduction of the catalytic converters into the positive displacement basin by means of a crane and by a longer dwell time with intermittent up-and-down motions of the catalytic converter, and also with the aid of washing systems.

The treatment time in the positive displacement reactor is at least 5 hours.

During the treatment, the positive displacement reactor experiences a flow through it of distilled water with a dwell time of 4 to 6 hours.

The charging of the positive displacement reactor is done continuously over the same time interval as the removal of the treated catalytic converter modules.

For each catalytic converter removed after the treatment time of six hours, one to be treated is introduced into the positive displacement reactor.

The temperature in the positive displacement reactor is 25° C. to 35° C.

During the continuous treatment, a pH value and an electrical conductivity that depend strongly on the composition of the contaminants become established in the distilled water of the positive displacement reactor.

Particularly catalytic converters that are used in exhaust gas scrubbing following the combustion of high-sulfur coal have high sulfate contents in the fly ash and may have deposits of sublimated sulfur on the outer surfaces of the catalytic converter module.

These contaminants result in a pH value between 1.8 and 4.3.

After the catalytic converter module has been treated in the discharge reactor, it is removed from the treatment liquid by means of a crane and rinsed if needed with distilled water.

The catalytic converter module is then delivered to the process step of ultrasonic treatment by means of a crane. In the ultrasonic reactor, the catalytic converter is exposed to a high-frequency ultrasonic vibration, at a frequency of 27 kHz to 40 kHz and a power density of approximately 6 watts per liter, with a simultaneous flow through it by means of a reciprocating motion (stroke height 100 mm, 5 to 8 strokes per minute) in distilled water at a temperature of 40° C. Depending on the degree of soiling, the temperature is increased, so that as a rule work is done in the range between 40° C. and 80° C.

The exposure to ultrasound takes place simultaneously from both open sides of the catalytic converter. The intensity of sonic exposure can be regulated and adapted to the degree of soiling. It can be regulated between 100% and 0% in 5% increments. The treatment time is as a rule 15 minutes. It can be increased as needed for stubborn soiling.

After the conclusion of the ultrasonic treatment, the catalytic converter is removed from the ultrasonic reactor by means of a crane and delivered to a final rinsing sink. The final rinsing sink is embodied as a spray rinsing sink. With a hand sprayer, the catalytically active inside faces of the catalytic converter module are rinsed with a total of approximately 100 liters of distilled water at a temperature of 33° C. over a time period of three minutes.

The water from the final rinsing sink is collected and delivered to the discharge reactor.

After the final rinse, the catalytic converter module is placed in a drying chamber, and dried, oil- and particle-free air is made to flow through it from bottom to top at a temperature of 70° C., until such time as the air flowing out of the catalytic converter module has a relative humidity of less than 20%.

The temperature of the air leaving the catalytic converter is thus equivalent to its temperature when it entered.

The required drying time, for a dry air flow volume of 4000 m$^3$ per catalytic converter module per hour, is eight hours.

The thus-regenerated catalytic converter, after cooling down, is then reinstalled in the catalytic converter system.

EXEMPLARY EMBODIMENT 2

Exemplary embodiment 2 pertains to the regeneration of catalytic converters of the above-described type, by means of distilled water with additives.

The process proceeds as in exemplary embodiment 1; in the positive displacement reactor, detergents to reduce the surface tension of the water are added to the distilled water. As detergents, cationic or anionic surfactants are added in concentrations of 0.001% (by volume) to 0.1% (by volume).

All the other process parameters remain as in exemplary embodiment 1.

EXEMPLARY EMBODIMENT 3

Exemplary embodiment 3 pertains to the regeneration of catalytic converters of the above-described type by means of distilled water with surfactants and chemicals to regulate the pH value.

The process proceeds as in exemplary embodiment 2, with detergents added to the distilled water in the positive-displacement container for reducing the surface tension of the water, with the simultaneous addition of acids and/or lyes to regulate and maintain an optimal pH value during the discharging process. As the regulating acids and lyes, caustic soda and hydrochloric acid are preferably employed.

All the other process parameters are as in exemplary embodiment 2.

EXEMPLARY EMBODIMENT 4

Exemplary embodiment 4 pertains to the regeneration of catalytic converters of the above-described type using drinking water instead of distilled water in all the process steps.

The process proceeds as in exemplary embodiments 1–3.

EXEMPLARY EMBODIMENT 5

Exemplary embodiment 5 pertains to the regeneration of catalytic converters of the above-described type by means of drinking water only in the process step of positive displacement.

Otherwise, the process proceeds as in exemplary embodiments 1–3.

In the positive displacement reactor, drinking water is used instead of the distilled water.

In the ultrasonic reactor and for the final rinsing, distilled water is used.

All the other process parameters are as in exemplary embodiment 1.

EXEMPLARY EMBODIMENT 6

Exemplary embodiment 6 pertains to the regeneration of catalytic converters of the above-described type by means of the addition of a complexing agent in the process step of the ultrasonic treatment.

Complexing agents, preferably ethylene diamine tetraacetate or EDTA, are added in concentrations of 0.1 to 5% to the distilled water in the ultrasonic reactor.

Otherwise, the process proceeds as in exemplary embodiment 1.

What is claimed is:

1. A process for regenerating catalytic converters, which catalyze reduction of nitrogen oxides into molecular nitrogen and which comprise titanium oxide $TiO_2$, tungsten oxide $WO_3$ and active component vanadium pentoxide $V_2O_5$, embodied as ceramic bodies, the process comprising putting a catalytic converter in reciprocating motion in a cleaning solution and subjecting the catalytic converter to an ultrasonic treatment, thereby regenerating about 95% to about 100% activity of the catalytic converter.

2. The process of claim 1, wherein the catalytic converter is subjected to a pretreatment by dry mechanical means.

3. The process of claim 1, wherein the catalytic converter is additionally subjected to a wet mechanical pretreatment.

4. The process of claim 1, wherein the catalytic converter, before the ultrasonic treatment, is subjected to a wet treatment in the discharge medium that is in motion.

5. The process of claim 1, wherein the discharge medium is substantially or entirely polar or a polar.

6. The process of claim 1, wherein the discharge medium is substantially or entirely hydrophilic.

7. The process of claim 1, wherein the discharge medium is substantially or entirely aqueous.

8. The process of claim 1, wherein the discharge medium contains additives for improving and/or speeding up the discharging process.

9. The process of claim 1, wherein the ultrasonic treatment is performed at temperatures between the freezing and boiling point of the cleaning solution, preferably between 40 and 80° C.

10. The process of claim 1, wherein the cleaning solution contains additives for speeding up or improving the separation of microparticulate contaminants or for speeding up or improving the solubilizing of catalyst poisons.

11. The process of claim 1, wherein the ultrasonic treatment takes place simultaneously or in alternation from one or both opened sides of the catalytic converter.

12. The process of claim 1, wherein the catalytic converter, after the ultrasonic treatment is ended, is rinsed with preferably an aqueous liquid.

13. The process of claim 12, wherein after the rinsing, the catalytic converter is dried in a drying chamber between temperatures 200 and 400° C.

14. The process of claim 13, wherein the drying takes place in air that is in motion.

15. A process for regenerating catalytic converters according to claim 1, wherein the ceramic body has a plate or honeycomb structure.

* * * * *